United States Patent [19]

Scobie et al.

[11] Patent Number: 4,648,418
[45] Date of Patent: Mar. 10, 1987

[54] FIREPROOF VALVE ASSEMBLY AND VALVE ELEMENT FOR USE THEREIN

[75] Inventors: William B. Scobie; Michael L. Wagberg, both of Houston, Tex.

[73] Assignee: Keystone International, Inc., Houston, Tex.

[21] Appl. No.: 836,543

[22] Filed: Mar. 5, 1986

[51] Int. Cl.$^4$ .............................................. F16K 17/14
[52] U.S. Cl. ....................................... 137/67; 137/74; 251/306; 251/317
[58] Field of Search ........................ 137/67, 72, 74, 75; 251/306, 316, 317, 308

[56] References Cited

U.S. PATENT DOCUMENTS

| | | | |
|---|---|---|---|
| 2,279,791 | 4/1942 | Lamb | 137/67 UX |
| 3,027,272 | 3/1962 | Ratzel | 137/67 UX |
| 4,194,521 | 3/1980 | Banta | 137/67 |
| 4,582,080 | 4/1986 | Stock | 251/317 X |

Primary Examiner—Harold W. Weakley
Attorney, Agent, or Firm—Browning, Bushman, Zamecki & Anderson

[57] ABSTRACT

A valve assembly comprising a valve housing defining an internal valve cavity and a fluid flow passageway, a valve element rotatably received in the valve cavity to control flow through the passageway, one of the valve housing or the valve element defining a seating surface, the other defining a seal member carrying surface, a coating of intumescent material disposed on at least a portion of either the seating surface or the seal member carrying surface, and a seal member carried on the seal member carrying surface on either the valve housing or the valve element for engaging the seating surface and effecting a seal between the valve using and the valve element.

12 Claims, 4 Drawing Figures

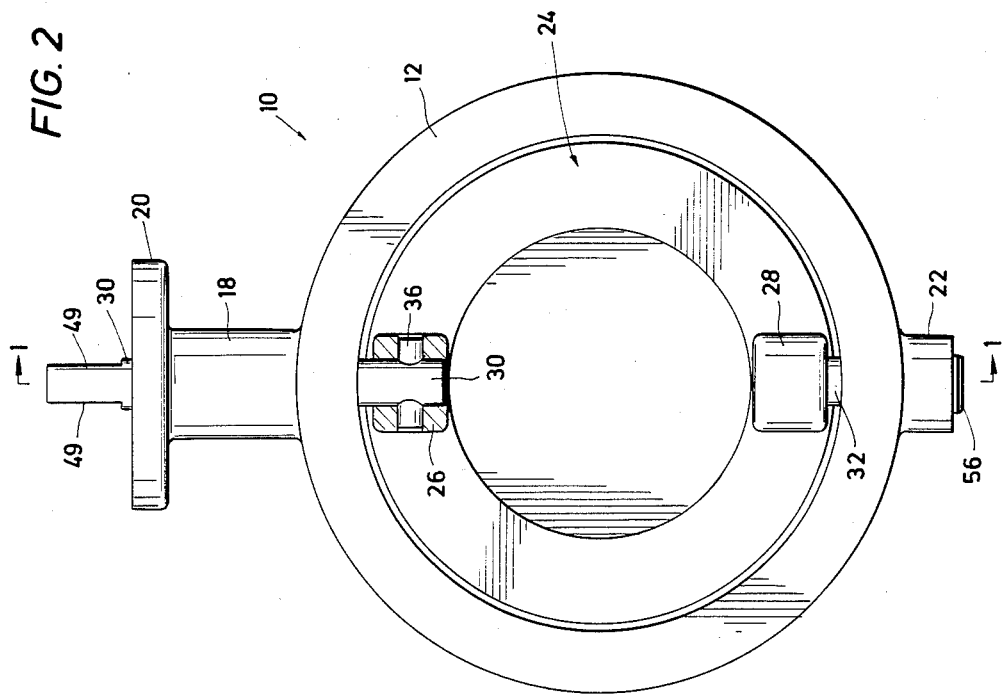
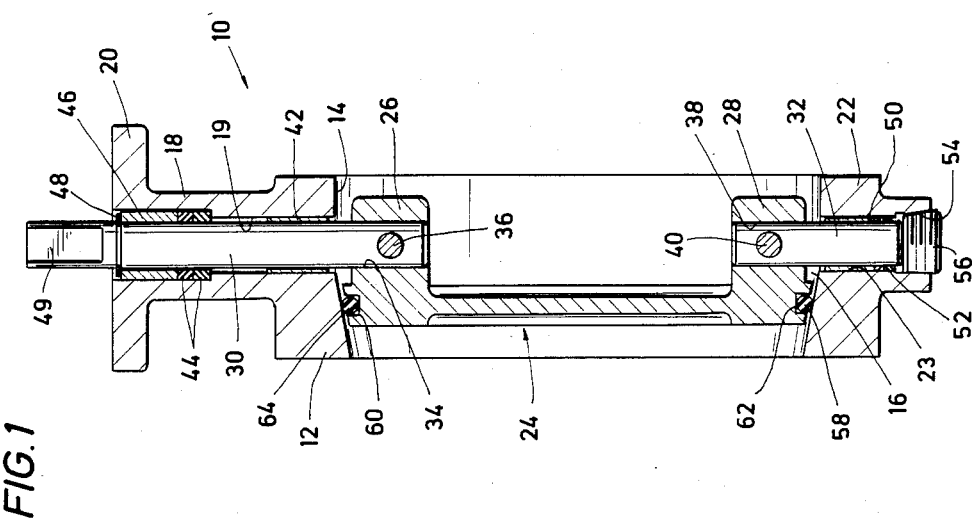

FIREPROOF VALVE ASSEMBLY AND VALVE ELEMENT FOR USE THEREIN

BACKGROUND OF THE INVENTION

1. Field of the Invention

The present invention relates to rotary valves, that is, valves in which a rotatable closure element is mounted in a flowway defined by the valve body so that it may be rotated between open and closed positions to control flow of fluids through the flowway.

2. Description of the Background

Rotary valves, such as butterfly or disk valves, ball valves, plug valves, globe valves and the like, are used in numerous industrial and military environments. In a typical rotary valve assembly, the valve body defines a fluid flowway and a cavity in which the valve element is disposed. There is also a suitable sealing assembly disposed in the valve cavity such that sealing between the valve body and the valve element can be effected to thereby prevent the flow of fluid through the valve when the valve is in the closed position. The sealing assembly used in many rotary valves is conventionally of an elastomeric and/or polymeric material although there are rotary valves which employ metallic seals and metal-to-metal contact to effect sealing. Indeed, valves which are in environments subject to fire or intense heat, which would virtually destroy a valve seat of an elastomeric or polymeric material, generally are provided with valve seals which are either composite in nature in the sense that there is a primary sealing section of a polymeric material and a secondary or backup sealing section of metal. Thus, in the event the polymeric sealing section is destroyed by fire, the secondary metal sealing section acts to effectively seal flow through the valve.

Although rotary valves employng only metallic seats do not suffer the disadvantages of having the seats destroyed when the valve is subjected to a fire or extremely intense heat, they suffer from certain infirmities. For one, fluid-tight sealing between a metal valve element and a metal seal is more difficult to achieve than sealing between a metal valve element and a resilient seal made of a polymeric material. Additionally, metallic seals are much more expensive to manufacture, present difficulties in installation and often times are subject to chemical attack by fluids flowing through the valve. Another problem with certain types of rotary valves employing metallic seals is that they present machining problems in that highly controlled tolerances must be maintained in order for the valve element and the valve seal to cooperate in effecting complete shutoff of flow through the valve.

Even in cases where metallic seals are employed in socalled fire-safe valves, it occasionally happens that the metallic seals, because they are constructed of very thin material, will distort under prolonged intense heat with the result that the valve will fail.

SUMMARY OF THE INVENTION

It is therefore an object of the present invention to provide a rotary valve assembly which is fire safe.

Another object of the present invention is to provide a fire safe rotary valve assembly which employs a polymeric or plastic seal which is fire or heat degradable.

Yet a further object of the present invention is to provide a rotary valve having an auxiliary, heat activated seal which can effect sealing between the valve body and the valve element when the valve is subjected to sufficient elevated temperature and/or fire.

Still a further object of the present invention is to provide a valve element for use in a rotary valve assembly which has an auxiliary, heat activated seal which can effect fluid sealing between the valve element and the valve housing in the event of failure of the primary valve seal caused by heat or fire.

The above and other objects of the present invention will become apparent from the drawings, the description given herein and the appended claims.

In accord with one aspect of the present invention there is provided a valve element for use in a rotary valve assembly, the assembly including a valve housing which defines a cavity for receiving the valve element and a flow passage for permitting the flow of fluid through the valve housing. The rotary valve assembly in which the valve element of the present invention is disposed also includes an annular seal means, generally, but not always, of a polymeric material or a heat or fire degradable, nonmetallic material for effecting sealing between the valve element and the valve housing. The valve element comprises a body member forming an exterior valve element surface and a coating or layer of intumescent material disposed on at least a portion of the exterior valve element surface. The intumescent coating on the valve element is heat responsive such that it can expand and form a fluid seal between the valve element and the housing in the event the valve element is subjected to high temperatures or fire.

In another aspect of the present invention, there is provided a valve assembly which includes a valve housing defining an internal valve cavity, the valve housing further including a fluid flow passageway. A valve element is rotatably received in the valve cavity to control fluid flow through the flow passageway. A seating surface is defined on at least one of the valve housing or the valve element while the other of the valve housing or the valve element defines a seal member carrying surface. Disposed on at least a portion of at least one of the seating surface or the seal member carrying surface is a coating or layer of intumescent material. The assembly further includes an annular seal member carried on the seal member carrying surface on one of the valve housing or the valve element for engaging the seating surface and effecting a seal between the valve housing and the valve element.

BRIEF DESCRIPTION OF THE DRAWINGS

The present invention is illustrated by reference to the drawings in which:

FIG. 1 is a longitudinal view, partly in section, of a disk valve assembly according to the present invention and showing the disk in the closed position;

FIG. 2 is an elevational view taken at right angles to FIG. 1;

DESCRIPTION OF THE PREFERRED EMBODIMENT

Figure 3:
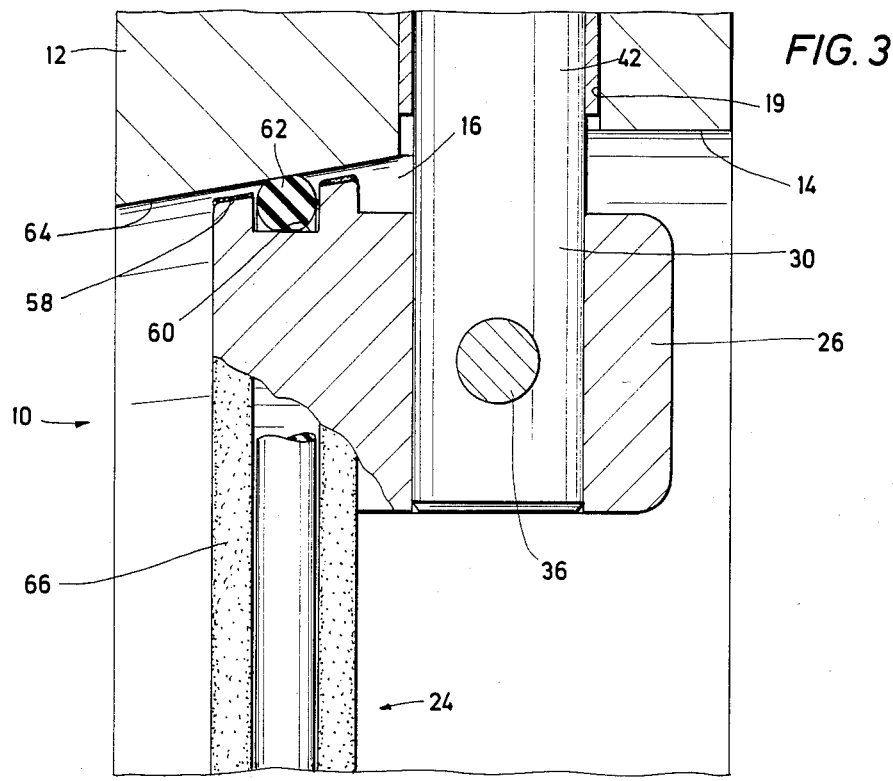
FIG. 3 is an enlarged, detailed, sectional view showing the peripheral edge of the disk valve element, the seal and the seating surface of the valve shown in FIGS. 1 and 2.

While the present invention will be described with particular reference to a butterfly or disk valve, it is to be understood that it is not so limited. The valve element and valve assembly described herein may be employed in any valve assembly having a rotatable valve closure element such as, for example, a ball valve, a plug valve, a globe valve, etc.

Referring first to FIG. 1, there is shown a butterfly valve 10 having a generally annular housing 12 with a fluid flow passageway 14 therethrough. Housing 12 also defines a cavity 16, in open communication with passageway 14, for receipt of a valve element described hereafter. The valve housing 12 is typically adapted for positioning between opposed pipe flanges (not shown). Extending outwardly from valve housing 12 is a cylindrical neck 18 formed integrally with housing 12, neck 18 having a cylindrical bore 19 communicating with valve cavity 16. A circular flange 20 formed integrally with neck 18 provides a means for securing an actuator (not shown) to valve 10. Diametrically opposite neck 18, protruding from and integral with housing 12 is a boss 22 having a cylindrical bore 23 in open communication with valve cavity 16.

Pivotally supported in valve cavity 16 is a fluid control disk shown generally as 24 having first and second hubs 26 and 28, respectively. Disk 24 is supported in valve cavity 16 by means of upper and lower shafts 30 and 32 received in bore 19 of neck 18 and bore 23 of boss 22, respectively. Shaft 30 extends into valve cavity 16 and is received in a bore 34 in boss 26. A dowel pin 36 secures shaft 30 to hub 26. In like manner, shaft 32 extends into valve cavity 16 and is received in a bore 38 in hub 28, shaft 32 being pinned to hub 28 by means of dowel pin 40.

Shaft 30 is rotatably journaled in bore 19 by means of bushing 42. Fluids are prevented from escaping valve 10 through bore 19 by means of packing rings 44 which are held in position by means of a packing gland 46. A keeper ring 48 serves to hold packing gland 46 in bore 19.

Shaft 32 is journaled in bore 33 by means of a bushing 50, packing rings 52 serving to prevent leakage from valve 10 through bore 19. Bore 19 is counterbored and tapped as at 54 and receives a threaded plug 56 to thereby close bore 33.

The upper end of shaft 30 protrudes above circular flange 20 and is provided with opposed flats 49 to provide a means for securing a hand wheel, wrench or other device such as an actuator, for rotating shaft 30 and hence disk 24 to effect opening and closing of valve 10.

Disk 24 has an annularly extending peripheral surface 58, surface 58 further including an annularly extending radially outwardly opening groove 60 in which is received an annular seal ring 62. Seal ring 62 cooperates with an annularly extending, generally conical seating surface 64, interiorly of valve housing 12. Seating surface 64 cooperates with seal ring 62 to effect a seal between valve housing 12 and disk 24. It can thus be seen that when the valve is closed as in the position shown in FIG. 1, seal ring 62 is in interference contact with seating surface 64 and fluid flow through flowway 14 is effectively prevented.

Referring now to FIG. 3, there is shown an enlargement of a portion of the peripheral edge of the disk 24, the seal ring 62 and the seating surface 64 in the valve body 12. FIG. 3 shows the valve in a normal state, i.e. without having been subjected to intense heat or fire. Disposed on the annular peripheral surface 58 of disk 24 is a coating of intumescent material 66, coating 66 being disposed on surface 58 on both sides of groove 60. As shown, the intumescent coating 66 does not contact seating surface 64 on valve housing 12; rather, annular seal ring 62 engages seating surface 64 when the valve is in the closed position as shown in FIG. 3.

Figure 4:
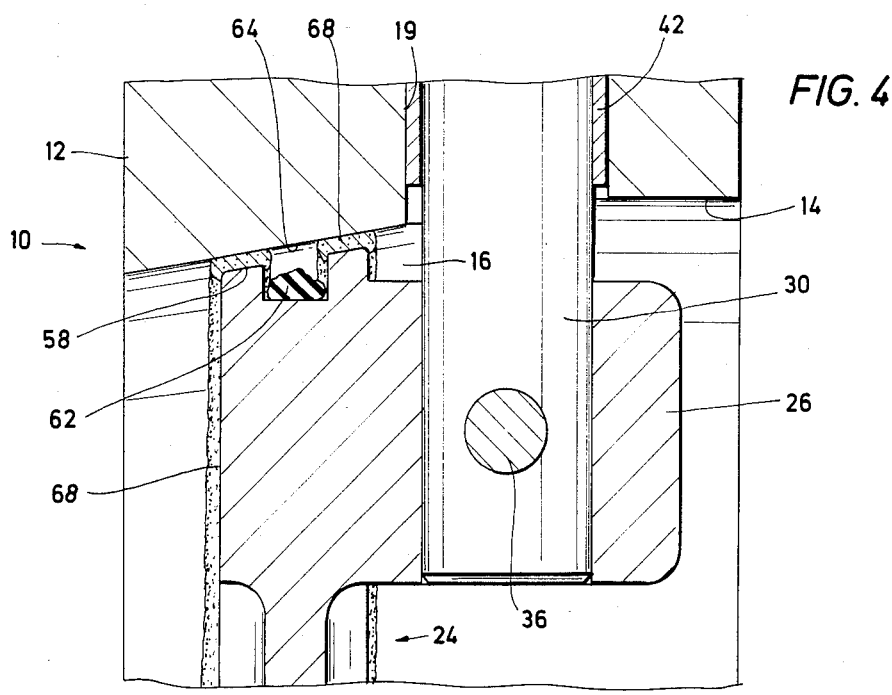
FIG. 4 is a view similar to FIG. 3 showing a portion of the seal burned away when the valve has been subjected to sufficient heat or fire.

Reference is not made to FIG. 4 which shows valve 10 after having been subjected to heat or fire sufficient to at least partially destroy seal ring 62. As seen, seal ring 62 has been destroyed to a sufficient extent such that there is no interference contact between seal ring 62 and seating surface 64 which ordinarily would allow leakage of fluid through valve 10. However, because of the presence of the intumescent coating 66 which has expanded because of being subjected to heat or fire, there is a bridging or auxiliary seal 68 formed between seating surface 64 and disk 24.

The terms "intumescent material" or "intumescent coating" refers to a material or substance which will enlarge, swell or expand under the influence of heat to form a bridging seal or barrier to prevent fluid flow. Such intumescent materials or intumescent coatings are comprised of various composites employing materials such as ceramic fibers, asbestos, metallic fibers, aramid fibers, vermiculite and other mineral substances, neoprene rubber and other synthetic materials or polymers, and expanding granules as well as other ingredients which can be made flexible and may expand up to ten times their original volume when exposed to high temperatures, e.g. above 250° F. A typical example of such intumescent or heat reactive substances are a series of heat reactive materials known as INTERAM and marketed by 3M. The intumescent coating or layer can be applied as by painting on a fluid or flowable formulation, wherein it can be spread on the desired surface, as a tape adhered to the desired surface, etc.

The term "coating" refers to a layer, deposition or thickness of intumescent material on the desired surface which is of sufficient volume so as to expand and provide a bridge between the seating surface and the seal carrying surface, when subjected to heat, so as to provide a fluidtight or substantially fluid-tight seal through the valve. Thus, the thickness of the coating or layer of the intumescent material will depend upon the spacing between the seating surface and the seal carrying surface of the valve.

The coating of intumescent material can be applied, as shown, either to the peripheral surface of the disk or, alternatively, if the resilient seal member is carried by the valve body, the intumescent material can be applied to the seal carrying surface on the valve body adjacent the seal. In this regard, it is well known that many butterfly valves employ resilient or polymeric seals which are received in a groove internally of the body, sealing being accomplished by an interference fit between the peripheral edge of a metallic disk and the rubber seat or seal carried by the valve housing. Also, the intumescent material can be carried by the seating surface, e.g. deposited in a groove in the seating surface.

While, as noted above, the invention has been described above with particular reference to a butterfly or disk valve, it will be apparent that the invention is not so limited. For example, in the case of ball valves, particularly of the floating type, wherein the ball valve element floats in a valve cavity under the action of line pressure to engage annular seal rings carried by the valve body, the intumescent material could be disposed on the valve body, in the cavity, and adjacent the annular seal members, i.e. on the seal carrying surface of the valve body. In like manner, the invention can be utilized in globe valves or other such rotary valve assemblies. In general, the present invention is applicable to any valve assembly wherein a valve element is movable from a first position in which the valve is opened to a second position in which the valve is closed and in which the valve includes a seal which is heat or fire destructable, e.g. a polymeric seal, or deformable, i.e. a thin metal seat.

The materials of construction of the intumescent material will depend upon the application to which the valve is put. It is only necessary that the material forming the intumescent coating have a structure, when expanded, so as to be able to withstand fluid pressure to thereby effect a seal between the valve element and the valve body.

While the present invention finds particular utility with valve assemblies which utilize resilient seals such as seal rings made of rubber, polymers, both natural and synthetic, fluorocarbon resins and the like, it also has application in valves which employ metallic seats which are thin and subject to deformation under heat or fire, whereby such metallic seats lose their integrity and shape and permit leakage of fluid through the valve.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. A valve element for use in a rotary valve assembly having a valve housing defining a cavity for receiving said valve element, a seal means for effecting sealing between said valve element and said valve housing, said valve element comprising a body member forming an exterior valve element surface, and a coating of intumescent material disposed on at least a portion of said exterior valve element surface.

2. The valve element of claim 1 wherein said body member defines a disk valve element, said disk valve element having a peripheral edge surface, said coating of said intumescent material being received on at least a portion of said peripheral edge surface.

3. The valve element of claim 2 wherein said peripheral edge surface forms an annularly extending surface and there is an annularly extending coating of said intumescent material on said annularly extending surface.

4. The valve element of claim 3 wherein said disk valve element includes a radially outwardly opening, annularly extending groove in said peripheral edge surface and there is an annular, heat degradable seal member received in said groove.

5. The valve element of claim 4 wherein said seal member comprises a polymeric material.

6. A valve assembly comprising:
   a valve housing, said valve housing defining an internal valve cavity, said valve housing further including a fluid flow passageway;
   a valve element rotatably received in said valve cavity to control flow through said flow passageway;
   one of said valve housing or said valve element defining a seating surface, the other of said valve housing or said valve element defining a seal member carrying surface;
   a coating of intumescent material disposed on at least a portion of at least one of said seating surfaces, or said seal member carrying surface; and
   an annular seal member carried on said seal member carrying surface on one of said valve housing or said valve element for engaging said seating surface and effecting a seal between said valve housing and said valve element.

7. The valve assembly of claim 6 wherein said valve element comprises a disk valve element.

8. The valve assembly of claim 7 wherein said disk valve element includes a peripheral edge surface, said coating of said intumescent material being received on at least a portion of said peripheral edge surface.

9. The valve assembly of claim 8 wherein said peripheral edge surface forms an annularly extending surface and there is an annularly extending coating of said intumescent material on said annularly extending surface.

10. The valve assembly of claim 9 wherein said peripheral edge surface includes a radially outwardly opening, annularly extending groove and there is an annular, heat degradable seal member received in said groove.

11. The valve assembly of claim 6 wherein said seating surface is on said valve housing in generally surrounding relationship to said flow passageway.

12. The valve assembly of claim 10 wherein said seal member comprises a polymeric material.

* * * * *